United States Patent [19]

Abiera

[11] 4,098,414

[45] Jul. 4, 1978

[54] PICKUP TRUCK LOADING RAMP

[76] Inventor: Primitivo A. Abiera, 4441 13th St., NE., Washington, D.C. 20017

[21] Appl. No.: 777,657

[22] Filed: Mar. 15, 1977

[51] Int. Cl.² ............................................. B60P 1/00
[52] U.S. Cl. ................................... 214/85; 403/231; 403/233; 193/5; 296/36
[58] Field of Search .................. 214/85, 85.1, 91; 296/36, 61, 11–12, 43, 51, 59; 248/218.4, 300, 539; 52/494; 280/33, 99 A, 99 R; 193/5, 39, 41; 14/69, 71.1; 403/231, 233

[56] References Cited

U.S. PATENT DOCUMENTS

| | | | |
|---|---|---|---|
| 1,626,597 | 5/1927 | Cantor | 193/5 |
| 1,753,487 | 4/1930 | Vaaler | 403/231 |
| 3,319,811 | 5/1967 | Martin, Jr. | 214/85 |
| 3,940,179 | 2/1976 | McBride | 296/36 |

*Primary Examiner*—Robert G. Sheridan
*Assistant Examiner*—Lawrence E. Williams
*Attorney, Agent, or Firm*—Sixbey, Friedman & Leedom

[57] ABSTRACT

Loading ramps for a truck having stake rack pockets are dimensioned to extend between adapters registerable with the pockets for non-use storage in a position where they function as side racks or vertical extensions thereof. The ramps are provided with a unique coupling means for engagement with the truck tail gate when in use.

15 Claims, 11 Drawing Figures

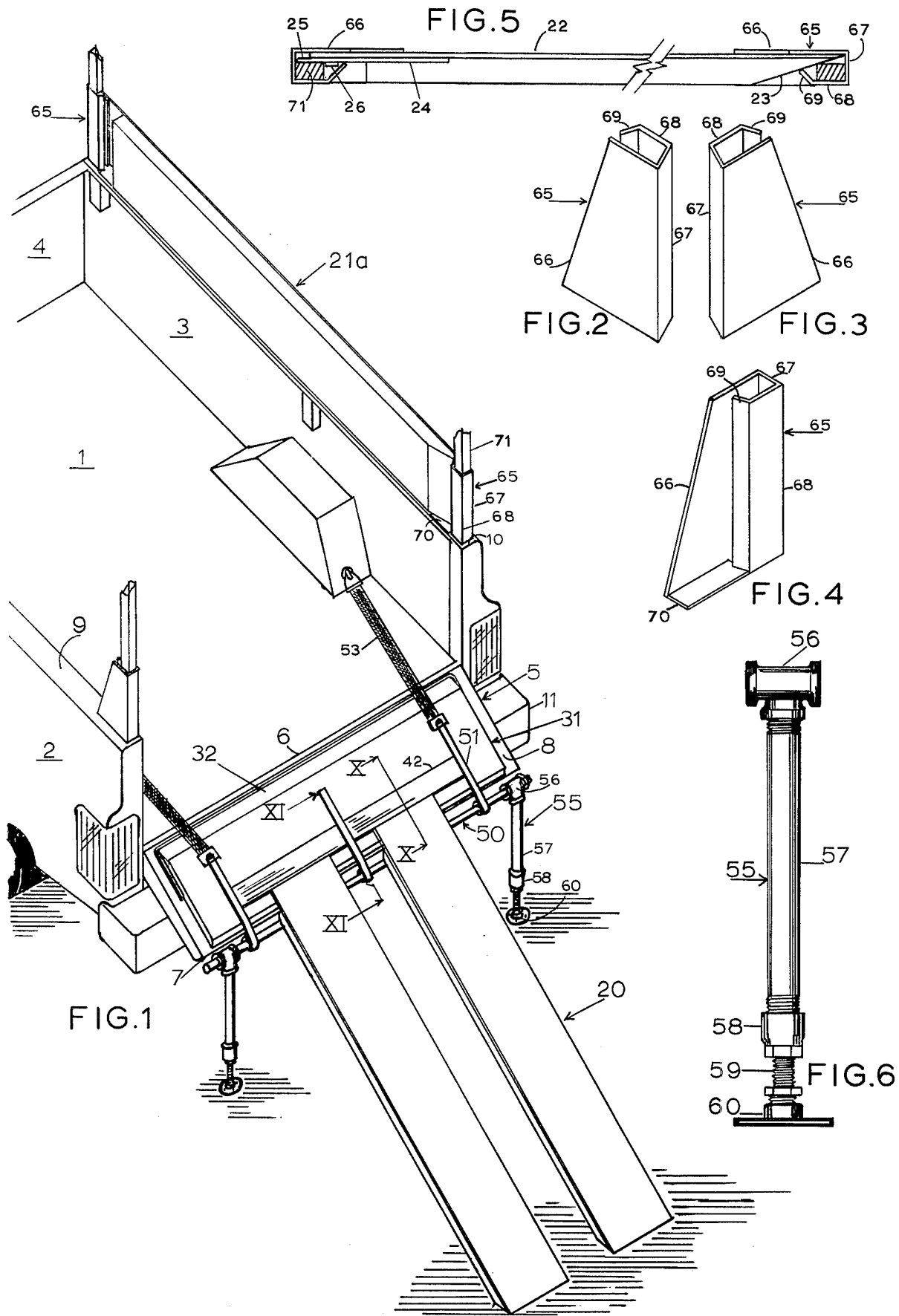

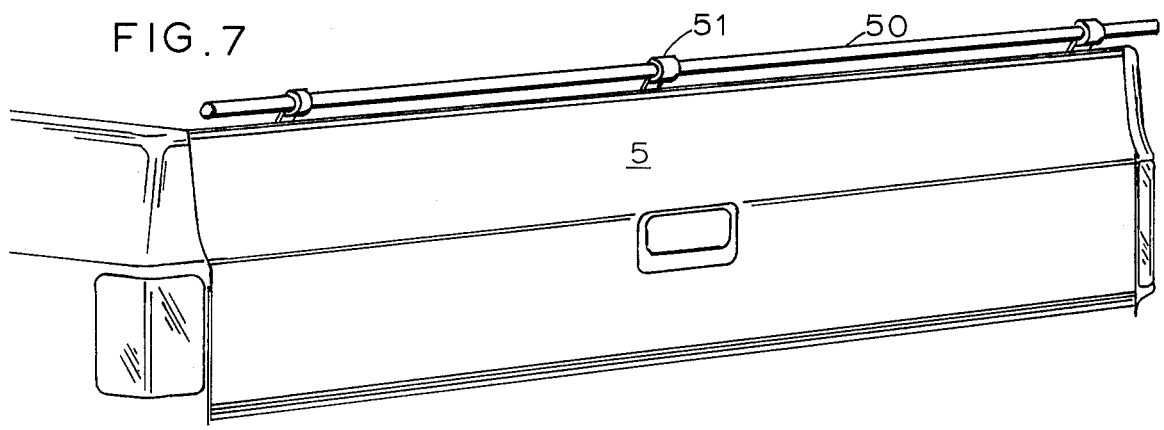
FIG. 7
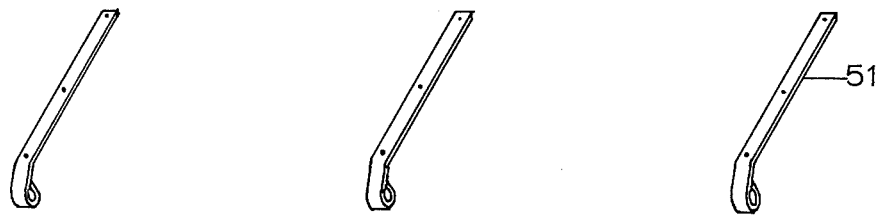
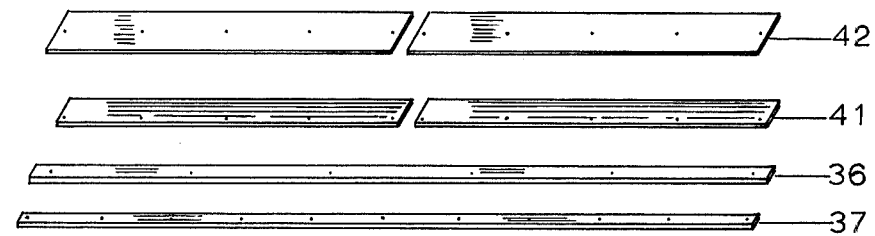
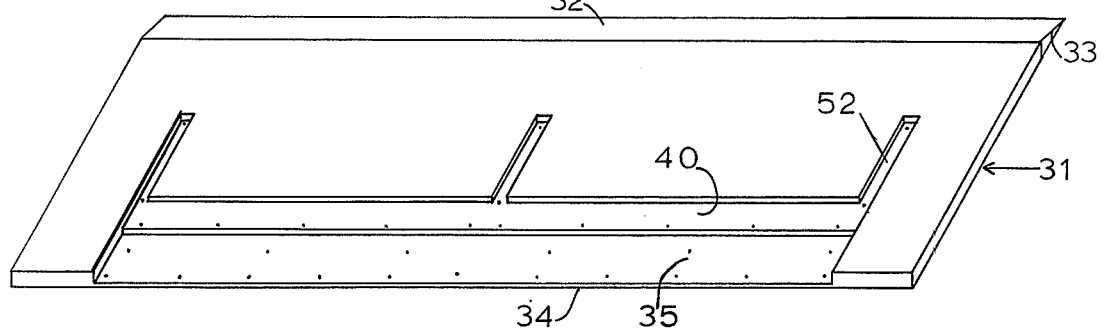
FIG. 8
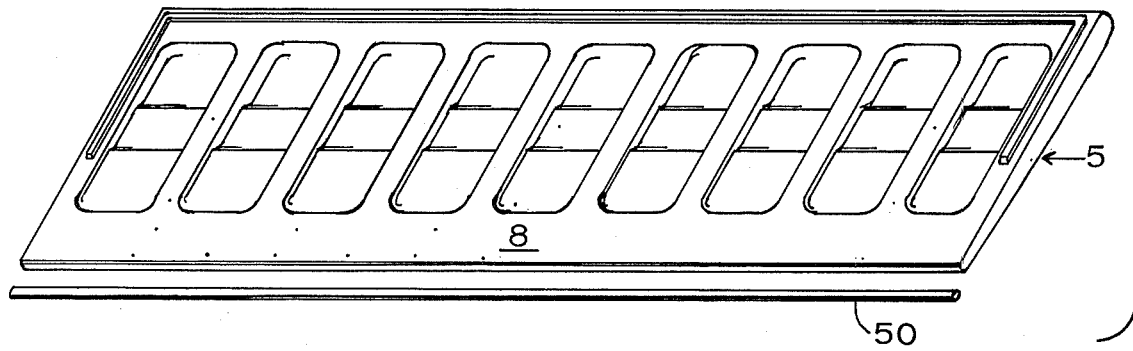

PICKUP TRUCK LOADING RAMP

FIELD OF INVENTION

This invention relates generally to loading ramps for load carrying vehicles, and particularly to such ramps which are engageable with a pickup truck tailgate for loading purposes and are stored for transit on the truck.

BACKGROUND OF INVENTION

Loading ramps have been in common use since the days of the horse drawn farm wagon. For almost as long, the problem of positioning the ramps for storage and transport when not in use has perplexed users to the extent that numerous structures were developed to cope with the problem. Among them are a rear rack which drops to function as a loading ramp (U.S. Pat. No. 1,893,532), an end gate which is removable and usable as a loading ramp (U.S. Pat. No. 313,333), a loading ramp which hangs on the side of a side rack (U.S. Pat. Nos. 1,828,551 and 3,763,827) and a loading ramp which is positioned as a side board within the cargo space (U.S. Pat. No. 3,737,058). In most of the aforementioned structures, the ramp performs no function when in its stored position. In those structures in which the ramp functions as a tailgate when in transport position, a compromise must be made between a length which is insufficient (i.e., excessively steep) for loading heavy equipment on the one hand and, on the other hand, a rack which is of a height that creates clearance problems when in transit. U.S. Pat. No. 3,319,811 discloses a structure wherein a side barrier is mounted to a truck bed by an extensible and pivotal mounting at one end of the barrier so that it may be captively maneuvered so as to function as a loading ramp.

Also known in the prior art are structures which provide for extending the height of the side barriers of a load carrying bed. Such structures include gussets to support side boards (U.S. Pat. No. 1,587,552) and side extensions for pickup trucks (U.S. Pat. No. 2,856,225).

Turning to prior art relating to means for coupling a loading ramp with a load carrying bed or tailgate of a vehicle, U.S. Pat. No. 3,339,968 reveals a ramp which registers with coupling means for permanent attachment to the tailgate. The coupling means is bulky and requires a covering plate 50 to provide a smooth approach for movement of a load, and places the entire weight of a load on the tailgate and ramp coupling means. Convenient detachment after each use is not contemplated or provided for.

OBJECTS OF INVENTION

It is among the objects of this invention to provide loading ramps for a pickup type vehicle wherein
1. the ramps are storable in a manner to provide extensions of the side walls of the truck bed,
2. use is made of adapters registerable with the conventional stake racks of the bed to mount the adapters to receive the ramps when in stored position,
3. the ramps are engageable with a slightly modified tailgate in a manner to provide smooth transition in running surface from gate to ramp,
4. the ramps are readily engageable with the tailgate and locked in engagement without the use of separate fasteners,
5. provision is made for ground support at the juncture of tailgate and ramp, and
6. the entire ramp and tailgate coupling is devoid of any protrusions which might impede the movement of a load thereacross.

DESCRIPTION OF DRAWINGS

The foregoing stated objects and other self evident objectives are attained by structures more fully set forth in the ensuing specification and illustrated in the accompanying drawings, in which:

FIG. 1 is a perspective view of a portion of a pickup truck bed illustrating two ramps in loading position, with an extra ramp in the stored position FIGS. 2, 3 and 4 are perspective views from different angles of the adapters for receiving the loading ramp in stored position, FIG. 5 is a top plan view of a loading ramp in stored position, FIG. 6 is a side elevational view of a ground engageable support, FIG. 7 is an exterior perspective of the tailgate, FIG. 8 is an exploded view of the component parts of a tailgate modified in accordance with this invention

DESCRIPTION OF INVENTION

Figure 9:
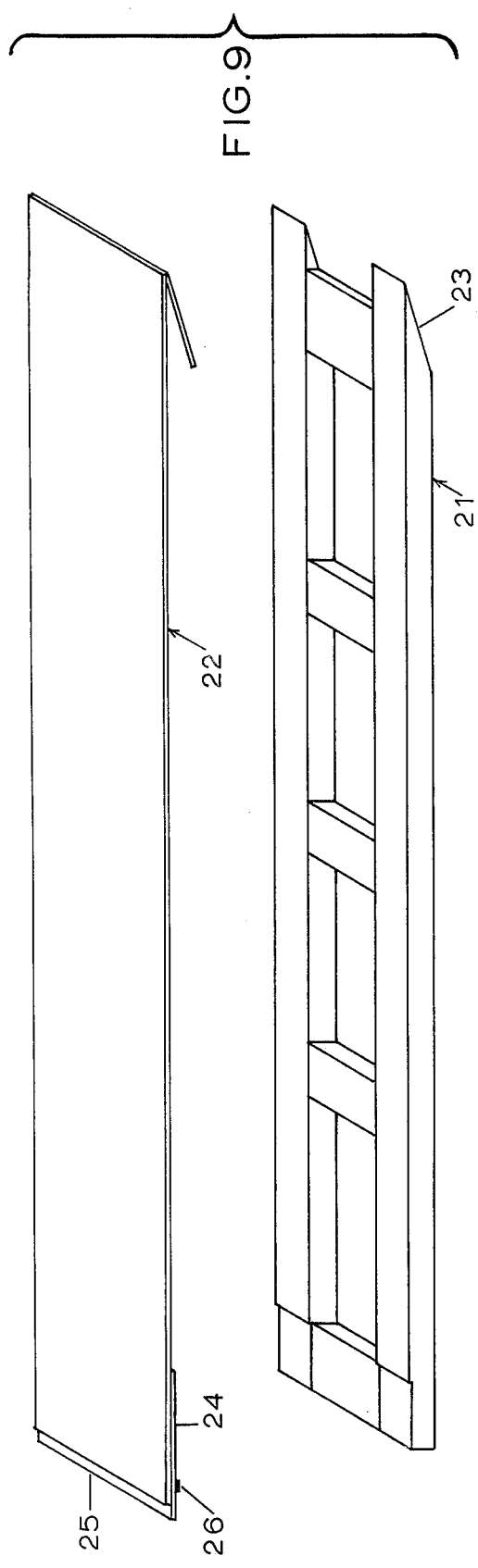
FIG. 9 is an exploded view of a ramp

Referring to FIG. 1, this invention is particularly adaptable to a pickup truck having a bed including a load supporting bottom 1, bed sides 2 and 3, and a front 4. A tailgate 5 is pivotally mounted to the bed about an axis proximate to the rear edge 6 of the bottom 1 and has a free edge 7 and inside surface 8. The bed sides are each provided with conventional mounting means for side barriers ordinarily employed, such as stake racks (not shown), the mounting means comprising stake pockets opening to the upper surface 9 through square apertures evident at 10. Pickup trucks are frequently provided with what is known as a step bumper as illustrated at 11.

This invention provides a pair of loading ramps 20, the construction of which is best illustrated in FIG. 9, and comprises a supporting frame 21 and a light weight cover 22 which, in a preferred embodiment, is formed of 3/16 inch thick aluminum. The ramp is tapered at one end as at 23 for registry with the ground surface, and the cover is formed at the truck engaging, or ramp coupling end to register with a tailgate-affixed complementary coupling member. Specifically, a ramp coupling plate 24 is affixed to the underside of plate 22 and extends beyond the end thereof to provide a coupling tongue 25 extending forwardly of cover 22 along the forward edge of the cover 22. Depending from the underside of plate 24 and spaced inwardly from the edge of the lip a distance approximately twice the distance of tongue extension is a locking lug 26.

Figure 10:
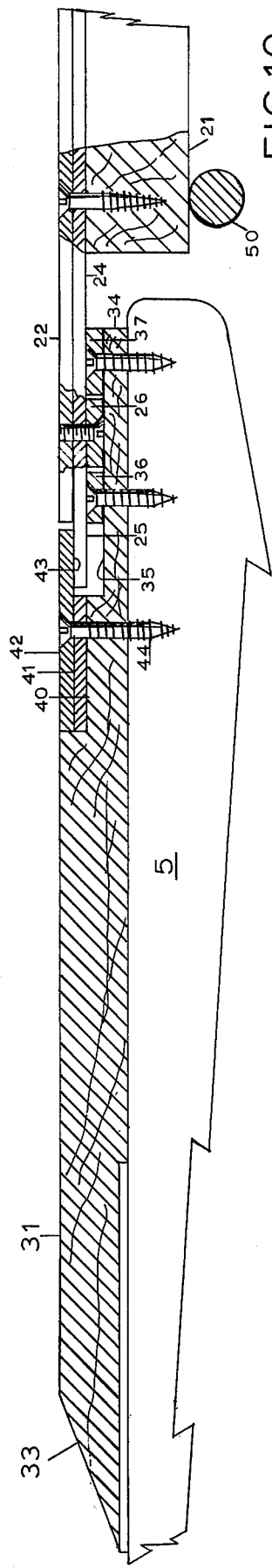
FIG. 10 is a longitudinal section taken through X—X of FIG. 1.
Figure 11:
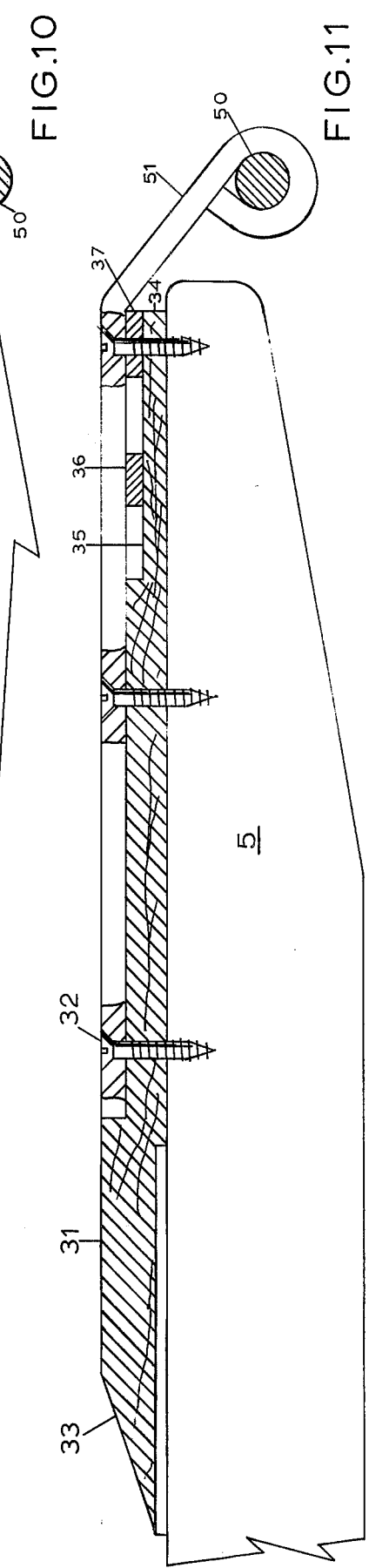
FIG. 11 is a longitudinal section taken through XI—XI of FIG. 1.

The tailgate 5 is provided on its inner surface 8 with a tailgate coupling member best understood when considered in cross-section as seen in FIGS. 10 and 11. The tailgate coupling member comprises a load distributing plate 31 affixed to the inner surface 8 of tailgate 5 by suitable fasteners, such as sheet metal screws as at 32. The dimensions of this plate are not critical, but should extend over the major surface of the tailgate 5 in order to avoid concentrated stresses thereon, and preferably has a forward edge 33 tapered to provide a smooth approach for a load exiting the truck bed. Load distributing plate 30 is, in a particular construction of a working model, formed of wood which is rabbeted along its rearward or coupling edge 34 to form a stepped surface 35 upon which are mounted a pair of metallic strips comprising an abutment strip 36 and a keeper strip 37 spaced from each other and from the forward portion of the stepped surface 35. The spaced relationship of abutment strip 36 and keeper strip 37 define a retention recess therebetween for reception of locking lug 26 of the ramp coupling plate 24.

The rabbeting along rear edge 34 of load distributing plate 31 also provides a second stepped surface 40 upon which is mounted a spacer strip 41 topped by a holddown plate 42, both of which may be fastened as at 44 by single fasteners extending through openings aligned with openings in the load distributing plate 31 and tailgate surface 8. Holddown plate 42 is dimensioned to include a lip portion 43 which projects over stepped surface 35 and defines a coupling recess between said surface and the underside of the projecting lip portion 43 of holddown plate 42.

The aforesaid structures provide cooperating coupling members, the operation of which is entwined with a supplemental supporting structure now to be described. Hence, a description of operation of the coupling members will appear after the supporting structure is described.

To the end that supplemental support may be provided for tailgate 5 when in the loading provision, a supplemental support rod 50 extends along and in spaced relationship to the free edge 6 of tailgate 5. Support for this rod is provided by a plurality of strap eyes 51 spaced laterally across the load distributing plate and received in channels 52 rabbeted therein in order to provide a flush upper surface. Optionally, an elastic strap 53 may be coupled between eye straps 51 and a secure mounting in the truck bed to partially support the tailgate 5 upon initial opening. This provision is desireable to avoid injury and excessive mechanical shock occasioned by the additional weight imparted to the tailgate by the structure of this invention.

Supplemental support rod 50 extends outboard of the outermost strap eyes 51 to provide cantelevered extensions which receive supplemental support legs generally indicated at 55 and shown in detail in FIG. 6. These support legs include a head 56 in the form of a tee having an aperture extending horizontally therethrough by which they may be slidably engaged with the cantelever ends of rod 50 as shown in FIG. 1, thus becoming journaled thereon whereby they may be aligned vertically in the fore and aft plane regardless of the pitch of the vehicle as determined by the contour of the ground on which it is situated. Each support leg 55 further includes a barrel 57 extending downwardly from the head 56 and terminating in a bushing 58 which receives a threaded shank 59 and foot 60. By the simple process of turning the foot 60 and shank 59 in relation to the bushing 58 a telescopic adjustment of the overall length of the leg 55 is accomplished in order to adjust to a particular ground contour.

In the operation of placing a ramp 20 in loading position, the tailgate is first lowered to the extreme open position, i.e., below the horizontal. In many trucks equipped with a step bumper 11, it will come to rest against the bumper at a position lower than ultimately desired, where placement of the ramps is facilitated. In vehicles not equipped with step bumper 11, it may be desireable at this point to place support legs 55 on the extensions of rod 50, tilting them toward the vehicle at their foot portions in order to allow the tailgate 5 to assume this low position. Each ramp 20 is placed in position at the desired lateral spacing by inserting its tongue 25 into the recess underlying lip portion 43 of holddown plate 42 on the tailgate coupling member. After each ramp is so inserted, the tailgate is raised to a position in alignment with the ramps. The supplemental support legs 55 are placed on the rod 50 if they have not already been so placed. The legs 55 should now fall into position to assume a vertical position, i.e., be in engagement with the ground directly below rod 50.

As the tailgate 5 was raised to become aligned, i.e., coplaner, with the loading ramps 20, coupling engagement was completed by the action of locking lug 26 dropping into the recess between abutment strip 36 and keeper strip 37. Moreover, the underside of the frame 21 of each ramp comes into engagement with support rod 50. To assure final alignment and firm support, feet 60 are rotated until the supplemental support legs are in firm ground engagement and the coupling is completely engaged.

The loading ramps are, of course, removed by the reverse of the procedure outlined above. It is interesting to note that the procedure of placing and removing the ramps 20 while the gate is in the lowered position avoids the necessity of raising the ground engaging ends 23 high in the air in order to effect coupling or uncoupling. Not only does this feature save lifting effort of ramps which of necessity are quite heavy, but it also contributes a significant safety feature in that the ends do not have to be lifted above head level where they might be collided with or fall upon a worker or passerby, or where they might cause the operator to loose control and drop them.

This invention also contemplates a means by which the ramps 20 may be stored during transit in a manner so as not to occupy cargo space useful for other materials and to contribute an additional function of extending the effectiveness of side walls 3. To this end, the mounting means comprising each corner stake pocket of the bed is provided with a rack element 65 shown in position in FIG. 1 and in detailed perspective in FIGS. 2, 3 and 4.

Obviously, the ramp 21a shown in FIG. 1 is a superflous unit added for purposes of indicating the relationship of ramp and bed side 3. Actually, only two ramps would be provided. Each rack element comprises a vertically extending channel defined by outside wall 66, end wall 67, inside wall 68, and an inturned flange 69 which terminates in spaced relationship to the outside wall 66 to define a clamping slit therebetween for reception of the ends of a ramp 20. Outside wall 66 extends beyond the slit to provide a guide for insertion of the ramp in the slit.

The rack element also includes a base 70 by which it may be affixed to the upper surface 9 of a bed side 2 or 3 by welding or by bolts (not shown). Preferably, however, the rack element is detachably secured by the simple expedient of extending a stake 71 through the vertically extending channel of the rack element 65 into the mounting means comprising stake pocket 10 of the bed side 2 or 3. This stake 71, which is shown in fragment in FIG. 1, may be one of the supporting stakes for an over-the-bed cargo rack of conventional construction.

Once in place, a pair of these rack elements 65 at opposite ends of a bed side 2 or 3 present opposed clamping slits for reception of the two ends of a ramp 20. By virtue of the aforedescribed ramp structure, each ramp has end portions which are thinner than the main body of the ramp, namely the projecting plate 22 and tongue 25 at one end, and the taper 23 at the other. Thus, the tapered end 23 fits into the slit of one element 65 whereas the plate 24 and coupling tongue 25 of the other end fits in the other element 65 of the pair as evident in FIG. 5. Note that the locking abutment 26 fits inside of the vertical channel. Preferably, the clamping slit is dimensioned to provide firm clamping engagement with the rack ends so as to avoid vibration and consequent rattling during transit.

From a consideration of the foregoing, it can be seen that the described preferred embodiment fulfills the objectives of this invention. The scope of the invention, however, is not limited to that of the described embodiment, but is to be determined by the following claims.

What is claimed is:

1. In a vehicle having a horizontal load carrying bed including mounting means disposed in predetermined spaced relationship along at least one side of the bed for ordinarily mounting a conventional substantially vertical side barrier, and at least one substantially planar loading ramp for disposition against a loading point associated with said bed when in an operative loading position, the improvement wherein said loading ramp has a longitudinal extent approximately equal to the predetermined spaced relationship of the mounting means, and ramp storage means comprising a pair of rack elements engageable with said mounting means and having means for removably retaining said loading ramp in a vertical plane with its longitudinal extent bridging the space between said rack elements when said ramp is in an inoperative storage position whereby said ramp functions as a side barrier in lieu of said ordinarily employed side barrier.

2. The ramp storage means set forth in claim 1 wherein at least one of said means for removably retaining said loading ramp comprises clamping means.

3. The combination set forth in claim 1 wherein said mounting means are stake pockets, said rack elements each include a vertical channel alignable with said stake pocket and engageable therewith by insertion of a stake through said channel and into said pocket.

4. The combination set forth in claim 2 wherein said loading ramp comprises end portions thinner than the main body portion for reception in said clamping means.

5. The combination set forth in claim 4 wherein said rack elements each include a vertical channel and said clamping means is comprised of slits formed in said channel, said slits being dimensioned for firm clamping engagements with said thin end portions of said ramp.

6. The combination set forth in claim 5 and including a guide means extending from an edge of said slit toward the other rack element of said pair to guide an end of the rack during insertion into said slit.

7. The combination set forth in claim 4 and including coupling means for coupling said ramp to a tailgate of said load carrying bed, said coupling means comprising a load distributing plate affixed to said tailgate, said load distributing plate including a stepped surface defining a depressed portion along the edge proximate to the free edge of the tailgate, a holddown plate including a lip portion extending over and in spaced relationship above said depressed surface to define a recess under said lip portion, and a keeper strip mounted on said stepped surface and spaced from said lip portion and wherein one said thinner end portions comprises a coupling tongue extending from one end of said ramp and insertable in the recess under said lip portion, and said tongue including a locking lug registerable between the recess and said keeper strip to retain said ramp and said tailgate in coupled relationship when in coplanar alignment.

8. The combination set forth in claim 7 wherein the other said thinner end portion comprises a portion tapered to register with the ground.

9. The combination set forth in claim 7 wherein said locking lug of said ramp tongue registers within said clamping means when said ramp is in stored position.

10. In a combination of a loading ramp and a tailgate mounted coupling means for coupling said ramp to a vehicle, the improvement wherein said coupling means comprises a load distributing plate affixed to the tailgate, said load distributing plate including a stepped surface defining a depressed portion along the edge proximate to the free edge of the tailgate, a holddown plate including a lip portion extending over and in spaced relationship above said depressed surface to define a recess under said lip portion, and a keeper mounted on said stepped surface and spaced from said lip portion, said ramp including a coupling tongue extending from one end thereof and insertable in the recess under said lip portion, said ramp further including a locking lug registerable between the recess and said keeper to retain said ramp and said tailgate in coupled relationship when in coplanar alignment.

11. The combination of claim 10 including supplemental support means comprising at least one telescopically adjustable assembly operatively connected to the free edge of the tailgate and having a foot portion engageable with the ground.

12. The combination of claim 11 wherein said telescopically adjustable support means are pivotally mounted to the free edge of the tailgate.

13. The combination of claim 12 wherein said pivotal mounting comprises a transversely extending support rod affixed to said load distributing plate and disposed proximate to the free edge of the tail gate and having projecting end portions at each side of the vehicle, and said support means comprise two telescopic supports each of which includes a head having a journal for engagement over said projecting end portions.

14. The combination of claim 12 wherein said load distributing plate has a tapered edge facing the hinge of the tailgate and wherein the upper surfaces of said load distributing plate, said holddown plate and said ramp are in coplanar relationship when in fully coupled relationship.

15. The combination of claim 10 wherein an abutment is affixed to said depressed surface between said keeper and said lip portion, and said locking lug is registerable between said abutment and said keeper.

* * * * *